(12) United States Patent
Lauriston

(10) Patent No.: US 11,115,635 B2
(45) Date of Patent: Sep. 7, 2021

(54) COMPUTER IMPLEMENTED COLOR SPACE CODING THAT DEFINES COLOR SPACE WITH FRACTAL GEOMETRY

(71) Applicant: Andrew Hugh Lauriston, London (GB)

(72) Inventor: Andrew Hugh Lauriston, London (GB)

( * ) Notice: Subject to any disclaimer, the term of this patent is extended or adjusted under 35 U.S.C. 154(b) by 51 days.

(21) Appl. No.: 16/509,868

(22) Filed: Jul. 12, 2019

(65) Prior Publication Data
US 2020/0020131 A1    Jan. 16, 2020

(30) Foreign Application Priority Data

Jul. 13, 2018 (GB) ..................... 1811525

(51) Int. Cl.
*H04N 9/64* (2006.01)
*G06T 7/90* (2017.01)
*G06T 11/00* (2006.01)

(52) U.S. Cl.
CPC .................. *H04N 9/64* (2013.01); *G06T 7/90* (2017.01); *G06T 11/001* (2013.01)

(58) Field of Classification Search
None
See application file for complete search history.

(56) References Cited

U.S. PATENT DOCUMENTS

| 5,416,848 A | 5/1995 | Young |
| 6,058,211 A | 5/2000 | Bormans et al. |
| 2006/0268297 A1 | 11/2006 | Han |
| | (Continued) | |

OTHER PUBLICATIONS

"Color Management: Color Spaces." Color Management: Understanding Color Spaces, www.cambridgeincolour.com/tutorials/color-spaces.htm. (Year: NA) (Year: NA) (Year: NA).*

(Continued)

*Primary Examiner* — Justin P. Misleh
(74) *Attorney, Agent, or Firm* — Thomas | Horstemeyer, LLP

(57) ABSTRACT

A computer implemented color space encoding system, encoder, decoder, method and data signal are disclosed. The encoding system comprises a data repository encoding data defining a fractal shape and a color space extending over the fractal shape whereby a color in the color space corresponds to a position on the fractal shape, the fractal shape having a fractal coordinate system for specifying a position on the fractal shape, an input interface configured to receive a color measurement and a processor configured to execute computer program code for executing a fractal coordinate encoder, including computer program code configured to obtain the color measurement from the input interface, computer program code configured to map the obtained color measurement to a color in the color space of the data repository, computer program code configured to determine the position of the color in the color space on the fractal shape and computer program code configured to output, via an output interface, fractal coordinates specifying the position on the fractal shape corresponding to the color measurement.

9 Claims, 2 Drawing Sheets
(1 of 2 Drawing Sheet(s) Filed in Color)

(56) References Cited

U.S. PATENT DOCUMENTS

2013/0050210 A1    2/2013    Michopoulos et al.

OTHER PUBLICATIONS

R. Chrapkiewicz, M. Jachura, K. Banaszek, and W. Wasilewski. "Hologram of a single photon". In: Nature Photonics 10 (2016). (Year: 2016).*
Pipenbrick, "Octree Color Quantization", Apr. 21, 1998, Hamburg, Germany, retrieved from https://www.cubic.org/docs/octree.htm.
Polycarpou, et al., "Adaptive Detection of Arbitrarily Shaped Ultrashort Quantum Light States", American Physical Society, PRL 109, Aug. 3, 2012.
European Search Report in co-pending, related EP Application No. 19 18 6351, dated Dec. 12, 2019.

* cited by examiner

COMPUTER IMPLEMENTED COLOR SPACE CODING THAT DEFINES COLOR SPACE WITH FRACTAL GEOMETRY

CROSS-REFERENCE TO RELATED APPLICATION

This application claims priority to GB Patent Application No. 1811525.3 filed Jul. 13, 2018, the contents of which are incorporated by reference in its entirety as if set forth herein.

FIELD OF THE INVENTION

The present invention relates to a color space encoding system, color encoder, color decoder and data signal that are particularly applicable for accurate color representation and communication.

BACKGROUND TO THE INVENTION

Color measurement and definition systems and methods are inherently inaccurate due to approximations that are made in capture, representation and rendering.

The portion of the electromagnetic spectrum that is visible to the human eye is known as the visible spectrum. Electromagnetic radiation in this range of wavelengths is often called "visible light" or simply "light". A typical human eye will respond to wavelengths from about 390 to 700 nanometers, which corresponds to a band in the vicinity of 430-770 THz.

When light hits an object, the object absorbs some of the light and reflects the rest of it. Which wavelengths are reflected or absorbed depends on the properties of the object. The reflected wavelengths that reach the eye determine the color that is "seen", that is, interpreted by the visual cortex and brain that produce the impression of that color to the viewer.

The human retina includes three types of receptors. These mostly respond to red, green and blue parts of the spectrum, respectively. There are a number of different estimates on how many colors can be differentiated by a human viewer, although it appears to be generally agreed that the number is at least 1 million and is potentially as much as 7+ million.

Both the electromagnet spectrum and human visual system are believed to be continuous. Colors blend from one to another and there are no discrete classifications. For example, the blue color part of the spectrum can be found in varying shades between just over 400 nm (at which point it is close to violet) to 500 nm by which point it is close to turquoise.

Digital devices and systems such as computers, cameras, data communication networks and displays are commonplace in our everyday lives. One of the many uses of such technologies is to measure, store and reproduce images including colors. By their very nature, digital devices use discrete representations. When they are used to measure, store and reproduce color, they do so as a discrete encoded value that approximates the value in the continuous color space.

Other factors also come into account when describing colors—for example whether a color is reproduced using the same output device, whether an illuminant is the same etc.

Measurement and definition of color is an important area in many industries. In the creative world, for example, significant sums are spent on technology in order to be able to consistently reproduce dyes, inks, fabrics, wallpapers etc. that are the "same". While chemical composition, substrate and other factors such as environment can impact whether something truly is the same, there is also the issue of comparison—can a monitor made by one manufacturer output the same red as one made by another? How do you define that same red in order to be able to communicate it?

Over recent years, a number of standards have been developed to ensure accurate color reproduction. In order to classify colors, a coordinate space is used for specifying where in a color space a measured color can be found. For example, the CMYK system approximates colors to their closest Cyan (C), Magenta (M), Yellow (Y) and Black (K) pigments and works on the basis that two printers using the same proportions of pigments should produce approximately the same color.

Systems such as CMYK are, to a certain degree, limited in precision by the associated inks/devices used. A more uniform system is the Pantone system which is a commonly used system for matching colors in printing and inks. A number of spot colors are standardized and each given a Pantone number. Most of these cannot be simulated using CMYK as they are formed from proportions of 14 base pigments. Pantone color numbers are used to prescribe colors to be used in reproducing all manner of items including logos and other typographic materials.

The majority of these scales were originally designed for use by manual operators with reference to printed sample books. While such books are reasonably user friendly as they can be used to match colors by users with varying degrees of skill/precision, they also have disadvantages. For example, it is recommended that Pantone sample books are replaced annually to take into account that the paper stocks will yellow over time, changing the appearance of the color of the inks printed on them.

CMYK and Pantone systems are primarily concerned with digital to output conversion (communicating the color of something in a coded representation so that it can be printed with color accuracy).

Other systems are concerned with input to digital conversion such as RGB color spaces. These approach the issues from an image capture and display device perspective, for example RGB classifies colors to closest Red, Green and Blue values based on predetermined viewing conditions. As many imaging devices measure color via RGB sensitive pixels, an RGB representation of an image is often the default generated. While many sensors do not have an R, G and B pixel at each point in its array, the interpolated values are often considered accurate enough.

The RGB color space is defined with respect to a unit cube. The cube is drawn using three axes: red, green and blue. Each point inside the cube defines a unique color. Generally, RGB colors are specified in terms of the intensity of the respective R, G and B components at each pixel. sRGB is a standard proposed by Hewlett-Packard and Microsoft based on a calibrated calorimetric RGB color space with an assumed gamma value of 2.2 (so that the standard is in theory device independent as all devices should have the same gamma value and substantially the same color rendition).

Due to the subjective nature of categorization systems such as Pantones (which require a degree of skill and judgement to determine which of various swatches in the book are closest to that being classified), measurement devices tend to produce results that can be expressed in a linear numeric scale such as CMYK, RGB, HSL etc.

As will be appreciated from the very brief summary above, there are many areas where approximations and rounding errors can arise. For example, Pantones typically only classify 1,114 color spots. If a color is not an exact match, it must be approximated to that closest if the Pantone classification is to be used. In the case of RGB representations, one area where inaccuracy arises is in encoding—an 8 bit RGB is only capable of representing 256 colors. While it is not uncommon for colors to be encoded in 16 or 24 bit representations (providing 65536 and 16,777,216 colors, respectively), these are still approximations with the original measurements being quantized to the closest value. However, the electromagnetic spectrum (which includes the color spectrum) is not formed from discrete colors, it is continuous.

As sensors and display devices become more sophisticated, so too does the granularity at which colors, brightness etc. is desired to be quantized at. This of course has to be balanced with processing and communication overhead—there is often a trade off between accuracy and storage size/time it would take to transmit the data.

STATEMENT OF INVENTION

According to an aspect of the present invention, there is provided a computer implemented color space encoding system comprising:

a data repository encoding data defining a fractal shape and a color space extending over the fractal shape whereby a color in the color space corresponds to a position on the fractal shape, the fractal shape having a fractal coordinate system for specifying a position on the fractal shape;

an input interface configured to receive a color measurement;

a processor configured to execute computer program code for executing a fractal coordinate encoder, including:

computer program code configured to obtain the color measurement from the input interface;

computer program code configured to map the obtained color measurement to a color in the color space of the data repository;

computer program code configured to determine the position of the color in the color space on the fractal shape; and, computer program code configured to output, via an output interface, fractal coordinates specifying the position on the fractal shape corresponding to the color measurement.

The color space and fractal shape may be encoded as being substantially continuous, the fractal shape comprising a plurality of iterations, each iteration defining the fractal shape with greater granularity, the computer program code configured to map the obtained color measurement to a color in the color space further including computer program code configured to traverse the iterations of the fractal shape until a match between the color measurement and a color in the color space is found.

The fractal coordinate encoder may include a precision parameter, the computer program code configured to traverse the iterations of the fractal shape until a match between the color measurement and a color in the color space is found being configured to determine a match upon a difference between the color measurement and a color in the color space being less than the precision parameter.

The input interface may be configured to receive the precision parameter from a user.

The fractal coordinate encoder may include an iteration limit parameter, the computer program code configured to traverse the iterations of the fractal shape until a match between the color measurement and a color in the color space is found or until the iteration of the fractal shape corresponding to the iteration limit parameter is reached, wherein upon the iteration corresponding to the iteration limit parameter being reached, the computer program code configured to map the obtained color measurement to a color in the color space being configured to select the color in the color space closest to the color measurement at that iteration.

The input interface may be configured to receive a data length value from a user, the fractal coordinate encoder further including computer program code configured to determine the iteration limit parameter from the data length value by selecting the maximum iteration at which data encoding a set of coordinates for a position at that iteration is less than or equal to the data length value.

The computer implemented color space encoding system may further comprise a measurement system connected to the input interface, the measurement system being configured to fire a photon at an item to be measured and measure the energy state of a reflected photon measured to determine the color measurement.

The computer implemented color space encoding system may further comprise a color space modelling system, the color space modelling system being configured to mix a photon with a matched laser pulse and encode the color and shape of the resultant emission as the fractal shape and color space.

The computer implemented color space encoding system may further comprise a lookup table in the data repository mapping colors in a further color space to corresponding positions in the fractal color space, the received color measurement comprising data identifying the color in the further color space, the fractal coordinate encoder including computer program code configured to determine fractal coordinates for the color from the lookup table and provide the fractal coordinates.

The computer implemented color space encoding system may further comprise a lookup table in the data repository mapping colors in a further color space to corresponding positions in the fractal color space, the fractal coordinate encoder including computer program code configured to receive fractal coordinates for a color, determine a corresponding color in the further color space for the fractal coordinates from the lookup table and provide data identifying the color in the further color space.

The computer implemented color space encoding system may further comprise computer program code configured to receive a further color measurement, computer program code configured to map the further color measurement to a further color in the color space of the data repository;

computer program code configured to determine the position of the further color in the color space on the fractal shape; computer program code configured to determine the position of the color and the further color at a common iteration in the fractal shape and computer program code configured to output the difference between the position of the color and the further color at the common iteration as a measure of the difference in the colors.

The difference may be expressed with respect to differences in a plurality of color components, for example with respect to Red, Green and Blue (or Cyan, Magenta and Black or some other color representation). It will be appreciated that in some embodiments that the surface of the fractal shape is multi-dimensional and differences between colors can be measured as the distance between two points on the surface in the multi-dimensions, each dimension preferably corresponding to a color component.

According to another aspect of the present invention, there is provided a color encoder comprising an input interface, a data repository and an output interface, the data repository encoding data defining a fractal shape having a plurality of iterations and a color space extending over the iterations of the fractal shape whereby a color in the color space corresponds to a position in an iteration on the fractal shape, the fractal shape having a fractal coordinate system for specifying a position on the fractal shape with respect to the iteration, the color encoder being configured to receive data identifying a color at the input interface, determine an iteration in the fractal shape at which the color is present in the color space and output, via the output interface a variable length data packet identifying the iteration and position in the fractal shape of the color at the iteration, the iteration determining precision and thereby length of the position value of the variable length data packet.

According to another aspect of the present invention, there is provided a color decoder comprising an input interface, a data repository and an output interface, the data repository encoding data defining a fractal shape having a plurality of iterations and a color space extending over the iterations of the fractal shape whereby a color in the color space corresponds to a position in an iteration on the fractal shape, the fractal shape having a fractal coordinate system for specifying a position on the fractal shape with respect to the iteration, the color decoder being configured to receive fractal encoded color data identifying an iteration and a position in the fractal shape and being configured to iterate through the fractal shape until the position is reached at the iteration, the color decoder being configured to determine the corresponding color in the color space and output data identifying the color via the output interface.

The color decoder may further comprise a color display device, the output interface being connected to the color display device, the data identifying color identifying the color in a format native to the color display device whereby the color decoder is configured to translate colors received in fractal coordinates into a color space native to the color display device.

The color decoder may includes data on supported color resolution of the color display device, the supported resolution comprising a maximum iteration value in the fractal shape, wherein upon receiving fractal encoded color data at an iteration value exceeding the supported resolution, the color decoder being configured to quantize the fractal coordinates into coordinates at the maximum supported iteration.

According to an aspect of the present invention, there is provided a method comprising: mapping a color space by fractal geometry;

encoding a color using fractal coordinates to specify the position in the fractal geometry corresponding to the color in the color space.

Embodiments of the present invention seek to provide a system, method and data signal format in which colors can be classified within a substantially continuous color space. Furthermore, embodiments seek to provide a system in which color definition within the substantially continuous color space can be defined in a data efficient representation and therefore minimize storage and communication overheads. In a preferred embodiment, embodiments enable color representation and definition to be extracted at differing levels of granularity but nevertheless derived from a source that is continuous.

It will be appreciated that fractal geometry enables representation at substantially infinite granularity. By application of a fractal geometry to a color space, the inventors in the present application enable color to be specified at a substantially infinite granularity. Furthermore, as the color can be specified using fractal coordinates according to its position in the fractal geometry, the color can be represented in a data efficient manner. Still further, by use of fractal iterations, the representations can be approximated as needed so that while the fractal color space may be infinite, a discrete quantized version can be provided that reflects the rendering capabilities of an output device, for example (as there is no point providing data that the output device cannot make use of).

Preferred embodiments include a translator configured to translate fractal coordinates to and/or from other color spaces such as RGB, CMKY, Pantone etc.

In a preferred embodiment, the color space and shape is modelled/mapped from that of a photon when mixed with a matched laser pulse. Such a technique generates a continuous color space that when mapped using fractal geometry can be used to specify colors to substantially infinite granularity. The fractal geometry enables controllable granularity and also an efficient mechanism for encoding values in the color space as position in the fractal geometry can be defined using fractal; coordinates.

Preferably, the method is used to provide the color space for the color management system of the applicant's patent application U.S. application Ser. No. 16/509,855, filed Jul. 12, 2019, which is herein incorporated by reference.

BRIEF DESCRIPTION OF THE DRAWINGS

The patent or application file contains at least one drawing executed in color. Copies of this patent or patent application with color drawing(s) will be provided by the Office upon request and payment of the necessary fee.

Embodiments of the present invention will now be described by way of example only, with reference to the accompanying drawings in which.

DETAILED DESCRIPTION

Figure 1:
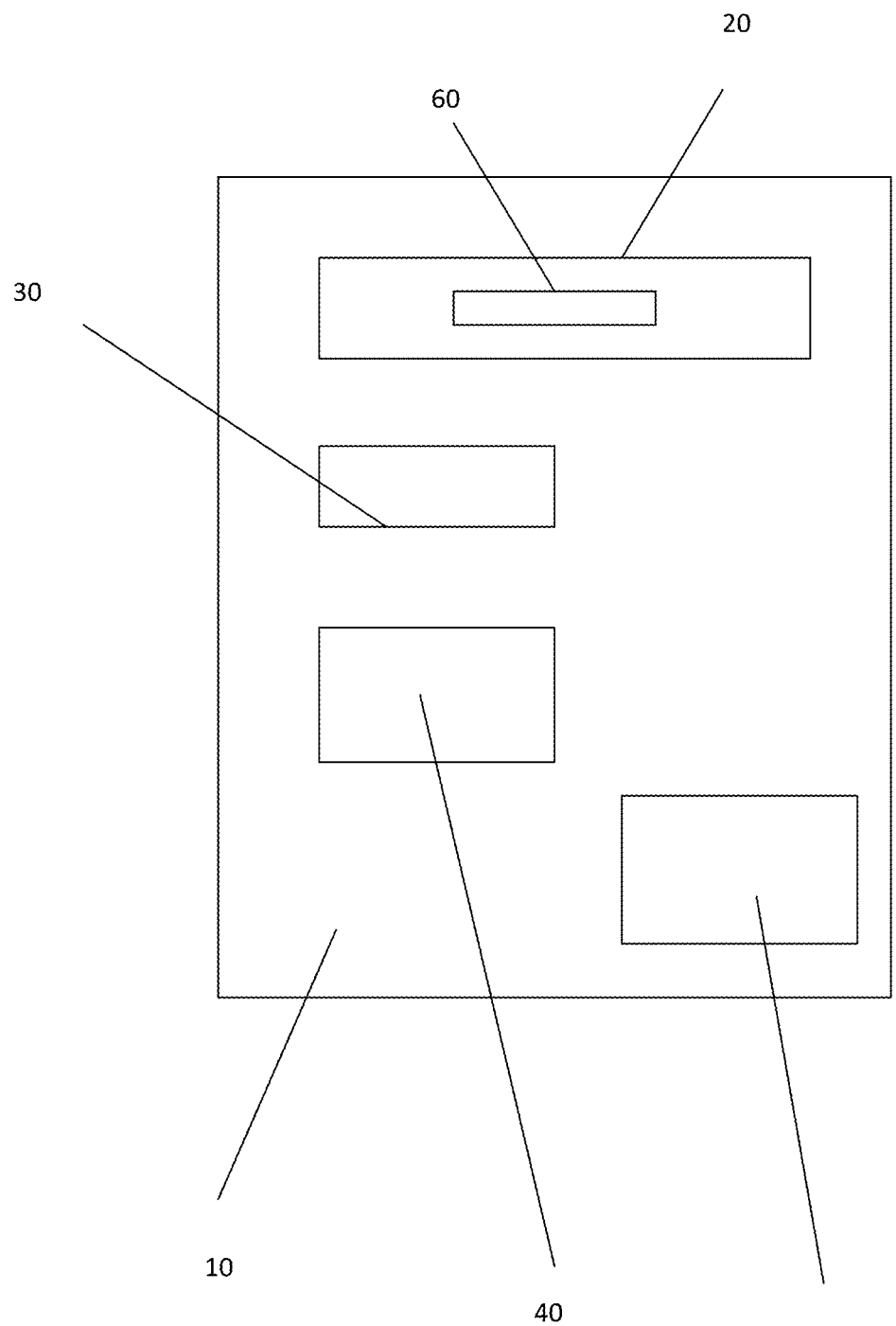
FIG. 1 is a schematic diagram of a system according to an embodiment of the present invention.

FIG. 1 is a schematic diagram of a system according to an embodiment of the present invention.

The system 10 includes a processor 20, memory 30, I/O unit 40 and a data repository 50.

The system 10 encodes a color space in the data repository that is mapped by fractal geometry.

Figure 2:
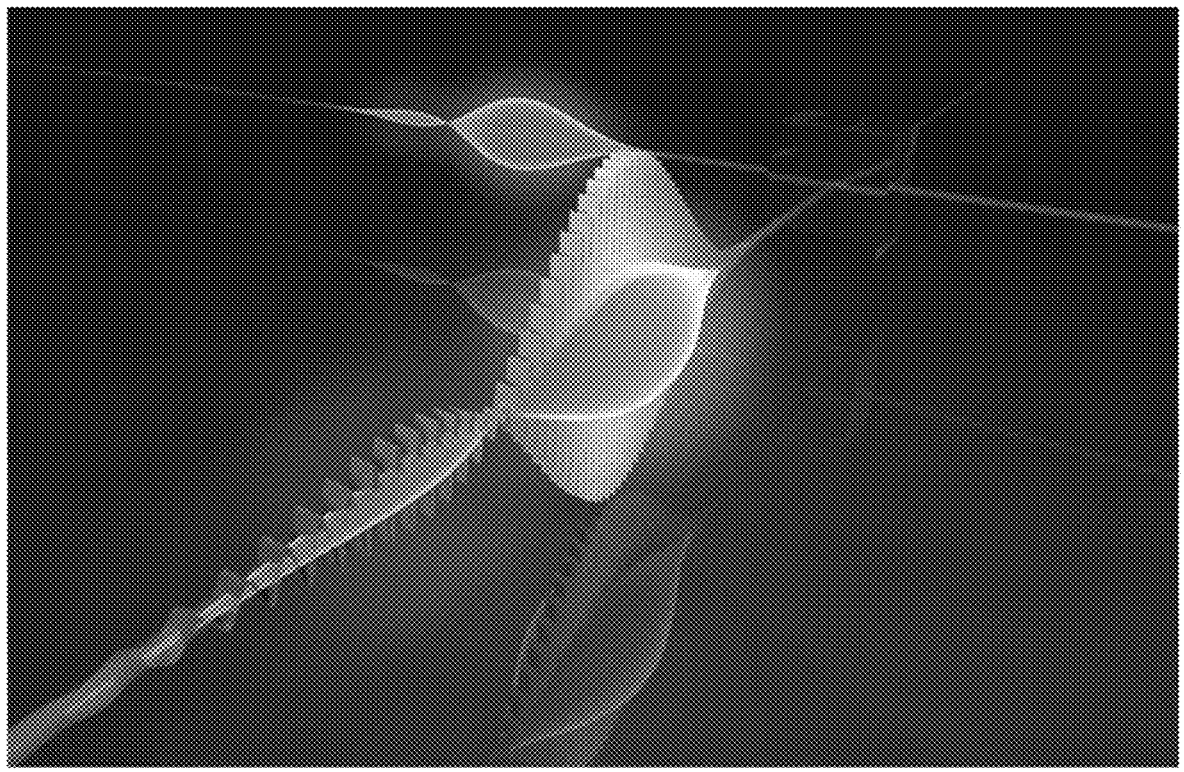
FIG. 2 is an image of a shape of a photon captured during an experiment.

An example of such a color space can be seen in FIG. 2. In this Figure, scientists at the National Institute of Optics in Florence, Italy (physics.aps.org/articles/v5/86) reportedly created two streams of ultrashort laser pulses by splitting a single laser beam. One stream was sent into a crystal that occasionally generated a pair of photons—one to be detected after intentional or unintentional morphing, the other to be used as a trigger for the detector. The other stream, called the local oscillator, contained more powerful pulses that the team could shape and then mix with photons. Photons were efficiently detected using local oscillator pulses that had a matching phase difference.

The inventor in the present application recognized two important attributes in this work: Firstly, the color space surrounding the photon from emissions from its differing energy states encompassed the continuous color spectrum; Secondly, the "shape" of the photon's surface could be represented using fractal geometry.

It is also worth noting that it would be expected that the photon's surface would also be in motion and this too could be represented using fractal geometry if necessary.

Taking these points in combination, a, preferably continuous, color space can be defined and represented using fractal geometry. Preferably the representation, parameters defining a fractal equation for the representation and/or measurements based on the representation, is/are stored in the data repository 50.

In order to address the color space, the system 10 includes a fractal coordinate encoder 60 that is defined by computer program instructions and executed by the processor 20 and memory 30.

In one embodiment, colors are measured natively in the color space. For example, in the example of FIG. 2, the photons may be fired at the color to be measured and energy state of the reflected photon measured to determine the color. In another embodiment, photons may be fired at two different colors and the difference in reflected photons used to represent difference in the colors. In either case, the results can be directly represented in the fractal geometry.

In another embodiment, a color reading is received at the I/O unit 40 that has a value defined by another color space such as 16 bit RGB. In this case, colors will preferably have been pre-measured and labelled in the fractal geometry so that their coordinates are known. These are then stored in a lookup table, for example in the data repository 50, defined by a mathematical relationship between the input value and the fractal coordinates or by some other means such as application to an artificial neural network to determine fractal coordinates that correspond to the color. The encoder uses the lookup table or other mechanism to identify the fractal coordinate address from the input color reading. It will be appreciated that many different color representations could be encompassed in this approach with the lookup table, neural network or other mechanism including translations from RGB, CMYK, Pantone etc. and being able to indiscriminately translate received color values into a common representation that can then be used for comparisons, matching etc. and also translation from the common representation back into one of the other representations (this is the subject of the applicant's U.S. patent application Ser. No. 16/509,855, filed Jul. 12, 2019, which is herein incorporated by reference).

In another embodiment, a color encoded by fractal coordinates is to be output to a display screen. In this embodiment, the encoder 60 (or a complementary decoder), reverses the process to provide a value in a color space appropriate to the display screen, again either by use of the lookup table, mathematically or by some other means such as application to an artificial neural network.

It will be appreciated that translation to different color spaces is not essential—indeed in the case of communication it is desirable that the representation remains in fractal coordinate space. One possible representation defines position in fractal coordinate space by iteration of the fractal and length along the fractal geometry at that iteration. Optionally, where there are different fractal geometries used (for example this could be used for data privacy so that geometries are numerically encoded and only those knowing the geometry:code match would be able to reproduce the colors), a data communication may also define the fractal geometry to be used to model the color space.

It will also be appreciated that input and output devices may use fractal color space coordinates natively, in which case translation to/from RGB or the like would not be necessary and the values could be used to model the full continuous color space.

Optionally, embodiments of the present invention may allow different iterations of modelling to be used. An example of this can be seen in FIG. 3 which is a series of images illustrating iterations of a fractal.

Figure 3:
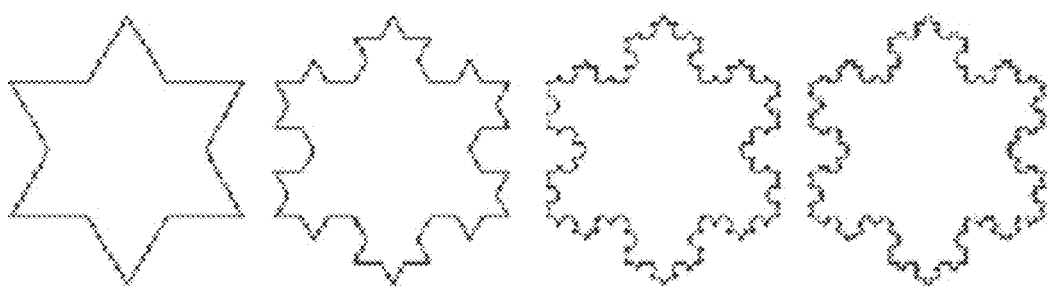
FIG. 3 is a series of images illustrating dimensions of a fractal.

FIG. 3 illustrates the initial stages of the Koch snowflake fractal. Here, the snowflake begins with an equilateral triangle with sides of length 1. In each iteration, at the middle of each side a new triangle one-third the size is added. This is repeated for an infinite number of iterations. The length of the boundary increases to infinity. However, the area encompassed remains less than the area of a circle drawn around the original triangle. That means that an infinitely long line surrounds a finite area.

In the case of the color space of FIG. 2, the iterations can be translated into accuracy of representation. At the lowest iteration (corresponding to the left-hand image of FIG. 3), color granularity is limited and likely comparable to an 8 bit RGB. If the color matches the color space at this level then there is no need to progress to a higher iteration and the color coordinate can be classified as, for example, (1, 1.8) corresponding to iteration 1, 1.8 units along the fractal geometry. If on the other hand the color measured does not match (for example if the imaging device is capable of resolving colors to a much greater precision), the matching process can progress into increasing iteration levels until a match at an appropriate iteration is found. For example, the number of shades of blue (or any other color) that can be defined at iteration 4 would far exceed that at level 1 or 2. As will be appreciated, the entire color space need not be navigated to match a color—a tree search approach or similar may be applied with the search identifying the closest two colors at the current iteration and then searching within the color space between those colors at the next iteration until a match is found (or a maximum desired resolution is reached and a closest approximation is selected).

This can be represented in a data signal that may include fields:
 a) Fractal shape used (optional, depends if multiple fractal shapes are used);
 b) Iteration of fractal shape;
 c) coordinate of color at the iteration It will be appreciated that the granularity of field c (coordinate) will depend on the iteration. The granularity may be controlled so as to limit iterations used or else it may be subject to some optimization such that the closest coordinate for a color is selected. There may be some intermediate optimization used such that a best iteration/color match is determined, optimizing size of field c against best color match. Such an optimization may be subject to user preference, system parameters or some other metrics. In some embodiments, a data signal may be received that is too large to be supported by a system—in such circumstances, the iteration field may be reduced and the associated coordinates quantized or otherwise translated into the coordinates for the reduced iteration prior to communication of the data signal.

Depending on the fractal geometry used, it may also be the case that a color at a high iteration coordinate can be quantized into one at a lower iteration for output by a display device that does not have the necessary resolution etc. This could be performed by the system 10 or a component in the output device (which would be pre-configured to "know" the maximum iteration level supported and be able to mathematically/computationally convert a coordinate at a lower level iteration into that of its maximum supported resolution.

A further use of the color space is in expressing differences between colors. As all colors from different color spaces can be represented in the fractal color space and the difference between those colors can be expressed using the fractal geometry, the differences can also be used to guide a user on magnitude of the difference and also on action needed to modify one color in order to arrive at the other. This could, for example, be done by measuring the change in position in the fractal color space of a color that arises from addition of a predetermined amount of a particular dye and then scaling this based on the magnitude of the difference to arrive at the desired color. In more complex cases this may involve solving a combinatorial optimization equation to determine the optimal proportion of dyes or other substances to be added to arrive at the desired color.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is indicated in the recitations in the statement of invention and equivalents thereof.

The invention claimed is:

1. A computer implemented color space encoding system comprising:
  a data repository encoding data defining a fractal shape and a color space represented by the fractal shape whereby colors in the color space correspond to positions on the fractal shape, the fractal shape having a fractal coordinate system with fractal coordinates for specifying the positions on the fractal shape and mapping the colors in the color space to the positions on the fractal shape;
  an input interface configured to receive a color measurement;
  a processor configured to execute computer program code for executing a fractal coordinate encoder, including:
  computer program code configured to obtain the color measurement from the input interface;
  computer program code configured to map the obtained color measurement to a color in the color space represented by the fractal shape by determining a position on the fractal shape corresponding to the obtained color measurement using the fractal coordinates; and,
  computer program code configured to output, via an output interface, the fractal coordinates specifying the positions on the fractal shape corresponding to the obtained color measurement.

2. The computer implemented color space encoding system of claim 1, wherein the fractal shape comprises a plurality of iterations, each iteration defining the fractal shape with a different granularity,
  the fractal coordinate encoder further including computer program code configured to traverse the iterations of the fractal shape until a match between the obtained color measurement and the color in the color space is found and to determine the position on the fractal shape where the match occurs.

3. The computer implemented color space encoding system of claim 2, wherein the match is determined based upon a difference between the obtained color measurement and data representing the color in the color space being less than a precision parameter.

4. The computer implemented color space encoding system of claim 3, wherein the input interface is configured to receive the precision parameter from a user.

5. The computer implemented color space encoding system of claim 1, further comprising a measurement system connected to the input interface, the measurement system being configured to fire a photon at an item to be measured and measure the energy state of a reflected photon measured to determine the color measurement.

6. The computer implemented color space encoding system of claim 1, further comprising a color space modelling system, the color space modelling system being configured to mix a photon with a matched laser pulse and encode the color in the color space and shape of the resultant emission as the fractal shape and color space.

7. A color encoder comprising an input interface, a data repository and an output interface,
  the data repository encoding data defining a fractal shape having a plurality of iterations and a color space represented by the iterations of the fractal shape whereby colors in the color space correspond to positions on the fractal shape, the fractal shape having a fractal coordinate system with fractal coordinates for specifying the positions on the fractal shape with respect to each iteration of the iterations of the fractal shape,
  the color encoder being configured to receive color measurement data representing a color at the input interface, determine a position on the fractal shape in an iteration of the iterations of the fractal shape at which the color is present in the color space, and output via the output interface a variable length data packet identifying the iteration and the position on the fractal shape within the iteration using the fractal coordinates of the fractal coordinate system.

8. A color decoder comprising an input interface, a data repository and an output interface,
  the data repository encoding data defining a fractal shape having a plurality of iterations and a color space represented by the iterations of the fractal shape whereby colors in the color space correspond to positions on the fractal shape, the fractal shape having a fractal coordinate system with fractal coordinates for specifying the positions on the fractal shape with respect to each iteration of the iterations of the fractal shape, the color decoder being configured to receive fractal encoded color data identifying an iteration and a position on the fractal shape within the iteration, iterate through the fractal shape until the iteration and the position within the iteration are reached, determine a color of the colors in the color space corresponding to the reached iteration and the position on the fractal shape within the iteration, and output fractal coordinates of the fractal coordinate system identifying the color via the output interface.

9. The color decoder of claim 8, further comprising a color display device, the output interface being connected to the color display device, the color display device configured to receive the fractal coordinates and identify a color in a color space native to the color display device.

\* \* \* \* \*